United States Patent
Lance et al.

(10) Patent No.: US 7,506,026 B1
(45) Date of Patent: Mar. 17, 2009

(54) METHODS FOR BUDDY INTERACTION REMINDER

(75) Inventors: John Lance, Littleton, MA (US); Sean Thompson, Atlanta, GA (US); Anuphinh P. Wanderski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/103,965

(22) Filed: Apr. 16, 2008

(51) Int. Cl.
*G06F 15/16* (2006.01)
*G06F 12/001* (2006.01)

(52) U.S. Cl. .................... 709/203; 709/206

(58) Field of Classification Search .......... 709/203, 709/206, 207, 217, 218; 707/3; 705/8, 10
See application file for complete search history.

(56) References Cited

U.S. PATENT DOCUMENTS

| | | | |
|---|---|---|---|
| 6,725,461 B1 * | 4/2004 | Dougherty et al. | 725/40 |
| 6,910,072 B2 | 6/2005 | Macleod Beck et al. | |
| 7,243,075 B1 * | 7/2007 | Shaffer et al. | 705/10 |
| 7,327,834 B1 * | 2/2008 | Hiers et al. | 379/88.18 |
| 7,353,182 B1 * | 4/2008 | Missinhoun et al. | 705/8 |
| 2005/0204007 A1 * | 9/2005 | McGregor et al. | 709/206 |
| 2008/0091653 A1 * | 4/2008 | Jamison et al. | 707/3 |

* cited by examiner

*Primary Examiner*—Zarni Maung
(74) *Attorney, Agent, or Firm*—Cantor Colburn LLP; Ayla A. Lari

(57) ABSTRACT

A method for an interaction reminder is provided to prompt a user to communicate with contacts based on a preset threshold of interaction. A setting for a level of interaction is received to communicate with a contact, where the level of interaction corresponds with a threshold. A setting is received for a type of interaction corresponding to the level of interaction for communication with the contact, where the type of interaction includes a telephone communication, an instant messaging communication, and/or an electronic message communication. The level of interaction is determined for communications with the contact. The level of interaction is increased and/or decreased based on a frequency of communications with the contact and based on the type of interaction with the contact. The level of interaction is displayed for communications with the contacts. A warning is provided in response to the level of interaction dropping below the threshold.

3 Claims, 4 Drawing Sheets

METHODS FOR BUDDY INTERACTION REMINDER

IBM® is a registered trademark of International Business Machines Corporation, Armonk, N.Y., U.S.A. Other names used herein may be registered trademarks, trademarks or product names of International Business Machines Corporation or other companies.

BACKGROUND

Exemplary embodiments of the invention relate to communications, and particularly to methods for prompting a user to contact individuals if the level of interaction drops below a threshold.

In today's computer age, it may appear that we are more connected than ever before. In many work environments, maintaining regular contact with individuals is an important component. Whether a sales person who needs to reach out to customers on a regular basis or a manager who needs to maintain a sense of their employees' activities, a certain level of connection must be maintained for the relationship to continue smoothly. Currently users must rely on their own memories or passive measures for determining their last or future contact.

It would be beneficial to have mechanisms in place to help users ensure a certain amount and type of contact with others.

SUMMARY

A method for an interaction reminder is provided to prompt a user to communicate with contacts in accordance with a preset threshold of interaction in accordance with exemplary embodiments. A setting for a level of interaction is received to communicate with a contact, where the level of interaction corresponds with a threshold. A setting is received for a type of interaction corresponding to the level of interaction for communication with the contact, where the type of interaction includes at least one of a telephone communication, an instant messaging communication, and/or an electronic message communication. The level of interaction is determined for communications with the contact. The level of interaction is increased and/or decreased based on a frequency of communications with the contact and based on the type of interaction with the contact. The level of interaction is displayed for communications with the contact. A warning is provided in response to the level of interaction dropping below the threshold.

Additional features and advantages are realized through the techniques of exemplary embodiments. For a better understanding of exemplary embodiments, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

The detailed description explains exemplary embodiments of the invention, together with advantages and features, by way of example with reference to the drawings.

DETAILED DESCRIPTION OF EXEMPLARY EMBODIMENTS

Exemplary embodiments provide a mechanism to prompt a user to reach out and contact particular individuals, e.g., if the level of interaction has dropped below a specific threshold. Also, exemplary embodiments take into account the quality of the interaction, e.g., an hour-long one-on-one meeting between a manager and her employee may have more weight then a simple email exchange.

Figure 1:
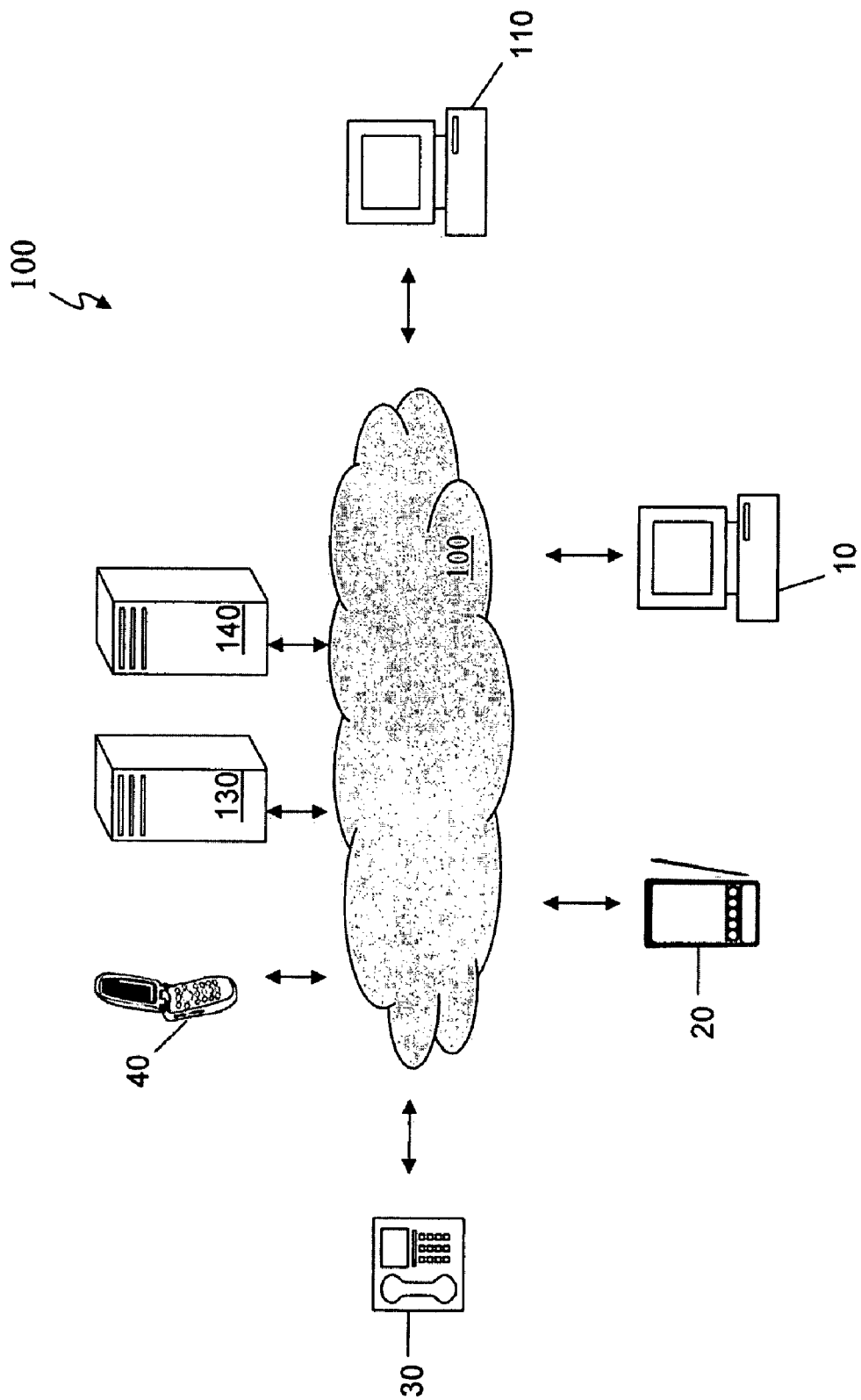
FIG. 1 illustrates a block diagram of a system in accordance with exemplary embodiments.

FIG. 1 illustrates a block diagram of a system 100 in accordance with exemplary embodiments.

The system 100 provides a non-limiting example of elements that may, but not necessarily, be included in a buddy interaction reminder (or a contact interaction reminder). The system 100 provides an infrastructure through which administrators can provide and users can access media (including video, audio, data, multimedia messaging, text messaging, etc.) through a plurality of communications devices, such as computing devices 10 and 110 or any other type communications device. It is understood that in exemplary embodiments and implementations, the communications devices can be a variety of communications devices, such as general purpose or laptop computers, wireless devices such as cellular telephones, portable computing device, digital music players (e.g., MP3 players), mobile devices, Internet protocol enabled televisions, navigation systems, etc. In addition, a wireline public switched telephone network (PSTN) telephone, session initiation protocol (SIP) telephone, dual-mode mobile telephone, personal digital assistant (PDA), or other type of communications device may be included in the system 100 of FIG. 1.

As a non-limiting example, the system 100 may include one or more servers 130 comprising all the functionality for implementing the exemplary embodiments. The server 130 may communicate via a network 100 with a plurality of communication devices, such as the computing devices 10 and 110, a personal digital assistant (PDA) 20, a telephone 30, a mobile communications device 40, etc. Also, the server 130 may interact with a plurality of servers, such as a server 140, via the network 100.

The system 100 can manage multiple accounts as established by particular users. An authentication server may be included in the system 100 to implement authentication software for restricting or controlling access to exemplary embodiments. A server may include a customer identity system (CIS) database, which stores user credentials (e.g., user names and passwords) and preferences.

In accordance with exemplary embodiments, access to the network 100 is not meant to be limiting in any way. The network 100 may include circuit-switched and/or packet-switched technologies and devices, such as routers, switches, hubs, gateways, etc., for facilitating communications over the network 100. The network 100 may include wireline and/or wireless components utilizing, e.g., IEEE 802.11 standards for providing over-the-air transmissions of communications. The network 100 can include IP-based networks and can facilitate communications over the Internet. Also, the network 100 may include wireline and/or wireless components utilizing standards for, e.g., multimedia messaging services (MMS). The network 100 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals, supporting a wide range of standard interfaces.

In exemplary embodiments, the network 100 can be a managed IP network administered by a service provider, which can control bandwidth and quality of service for communications discussed herein. The network 100 may be implemented in a wireless fashion, e.g., using wireless protocols and technologies, such as WiFi, WiMax, BLUETOOTH, etc. The network 100 can also be a packet-switched network, such as a local area network, a wide area network, a metropolitan area network, an Internet network, or other similar types of networks. The network 100 may be a cellular communications network, a fixed wireless network, a wireless local area network (LAN), a wireless wide area network (WAN), a personal area network (PAN), a virtual private network (VPN), an intranet or any other suitable network, and the network 100 includes equipment for receiving and transmitting signals, such as a cell tower, a mobile switching center, a base station, and a wireless access point.

As further shown in FIG. 1, the servers 130 and 140 may be implemented using a high-speed processing device (e.g., a computer system) that is capable of handling high volume activities conducted with network entities via the network 100.

Furthermore, exemplary embodiments are not limited to but are capable of being implemented in the system 100 illustrated in FIG. 1. Additionally, the servers 130 and 140 may be representative of numerous servers. Likewise, the network 100 may be representative of numerous networks. The plurality of communications devices discussed herein (such as the computing devices 10 and 110, personal digital assistant (PDA) 20, telephone 30, mobile communication device 40) may be representative of numerous communications devices. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

Figure 2:
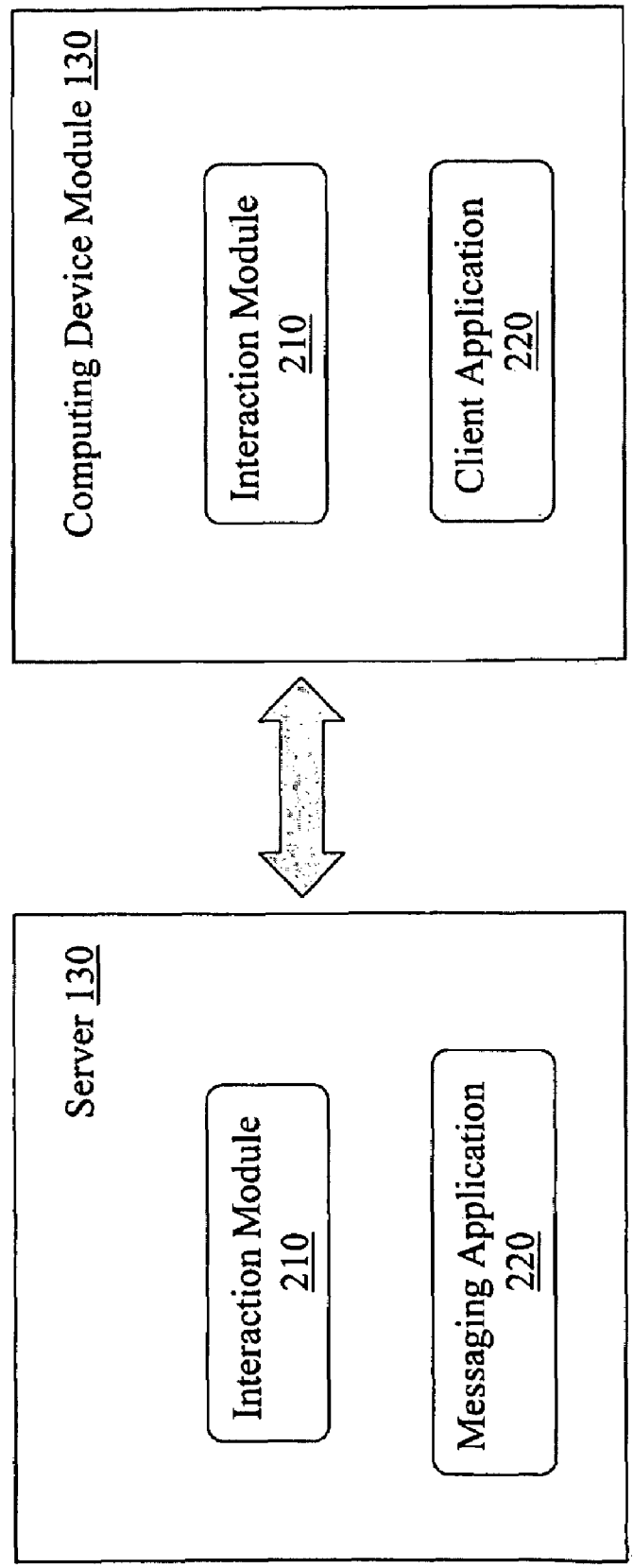
FIG. 2 illustrates the server and the computing device in accordance with exemplary embodiments.

FIG. 2 illustrates the server 130 and the computing device 110 in accordance with exemplary embodiments. The server 130 may include a messaging application 220. The messaging application 220 may be configured to perform email operations and functions, such as transmitting and receiving electronic mail over the network 100. The messaging application 220 may be configured to perform instant messaging (IM) operations and/or functions, such as transmitting and receiving instant messages over the network 100. The messaging application 220 of the server 130 and a client application 230 of the computing device 110 (or computing device 10) may cooperate in a server-client relationship for transmitting and receiving electronic messages and instant messages.

Moreover, as understood, by those skilled in the art, the server 130 may operate as an email server and/or and instant messaging (IM) server, and the server 130 includes all the requisite software and hardware for accomplishing the same. As a non-limiting example, the server 130 (or the messaging application 220) may include a mail transfer agent, (MTA) (also called a mail transport agent, message transfer agent, or smtpd (short for SMTP daemon)) which transfers electronic mail messages from one computer to another. As a non-limiting example, the server 130 (or the messaging application 220) may include a mail delivery agent (MDA) that delivers e-mail messages after they have been accepted on a server, by distributing the electronic messages to recipients' individual mailboxes (if the destination account is on the local server), or forwarding to another SMTP server (if the destination is on a remote server) like the server 140. Further, the server 130 may include the functions of or interact with platforms, such as IBM LOTUS SAMETIME™, MICROSOFT OFFICE COMMUNICATIONS SERVER™, and JABBER XCP™. It is understood that many other servers, relays, routers, switches, etc, may be included in the network 100 to implement email and instant messaging services.

In accordance with exemplary embodiments, the server 130 may also include an interaction module 210 configured to determine the amount of interaction with contacts, such as individuals or groups and to provide reminders accordingly. As illustrated in FIG. 2, the computer device 110 may also or alternatively include the interaction module 210. As a non-limiting example, the interaction module 210 may be integrated into an IM buddy list or any type of contacts database/UI. Also, the server 130 may have a telephony component, such as voice over Internet protocol (VOIP), that cooperates with the interaction module 210, and/or the server 130 may cooperate with a telephone server (e.g., the server 130) or a telephone service provider.

In exemplary embodiments, the interaction module 210 may have a graphical user interface (GUI), which displays an indicator on the computing device 110 to illustrate the degree of interaction with contacts of a user. As a non-limiting example, the indicator may delineate various categories, such as a frequent high quality interaction, frequent low quality interaction, infrequent high quality interaction, infrequent moderate interaction, infrequent low quality interaction, etc. The indicator may be a bar graph or some type of meter for quickly signifying the level of interaction with a contact. For example, the level of interaction may be displayed by interaction meter.

The interaction module 210 automatically upgrades and downgrades the indicator based on the amount and quality of communications with contacts; as determined by the interaction module 210 in accordance with exemplary embodiments. The quality of communication may take into account that some types of communication are more valuable then others. As a non-limiting example, talking to a person on the telephone makes for a qualitative, personal connection. CCing someone on an email, while is indeed contact, is incidental contact and therefore is not as high quality as the telephone call. The user would be able to designate weightings of what does and does not constitute quality contact and how highly valued such contact should be considered.

According to exemplary embodiments, when using the interaction module 210, an alarm can be set for a certain threshold of interaction that the user wants to maintain, e.g., with a respective client, group, or friend. As a non-limiting example, the user may want to maintain a frequent high quality interaction with the client, and the user may want to be alerted if the interaction determined by the interaction module 210 falls below the frequent high quality interaction level on the indicator. The user can also view the indication meter to observe the level of interaction with the client.

Also, in accordance with exemplary embodiments, the user can designate the weights of different interactions. As a non-limiting example, a telephone call may be considered of higher value than an email exchange, or an email exchange may be considered of higher value than an instant message exchange. Further, an email from the user to a recipient without a return email from the recipient may be considered as less value than an email exchange (where the recipient transmits a return email). Likewise, transmitting an instant message to a recipient and receiving a return instant message (e.g., an instant message exchange) may be considered a higher value than receiving no return instant message from the recipient.

Furthermore, the "degree of interaction" can be generated based on various types of interactions, and the types of interactions can be evaluated based on the number of interactions and the number of other individuals involved. As a non-limiting example, an email from a sender to just the user may count as a high quality interaction while a mass email to many people of whom the user was just one may count as a low quality interaction. A similar strategy could be applied to meetings, chats, calendar entries, telephone calls etc.

Note that calendar entries may contain an interesting factor in that there is also the component of an "expected" interaction, whereby a weekly, one-on-one meeting that is expected to occur (and has historically been proven to occur) can be used as a factor when calculating the degree of interaction in exemplary embodiments.

The following is a non-limiting example of a case in which Samantha is a user and she receives a warning regarding her interaction in accordance with exemplary embodiments. Samantha is in sales, and Acme Corporation is one of her clients. It is important that she frequently touches base with her contact, Bob. Using the interface (GUI) of the interaction module 210, Samantha can indicate that Bob is someone she wants to maintain frequent contact with which implies some sort of direct, one-on-one contact (or equivalent lesser interactions) a week. The parameters and definition for frequent contact may vary according to user preferences. Indeed, there are many options for setting the amount and/or type of contact that Samantha desires. For example, she may indicate that Bob is someone she needs to maintain moderate or minimal contact with, or Samantha may not set any threshold for contact with Bob at all.

Continuing the example, if a week goes by without Samantha contacting Bob, Samantha receives a warning (e.g., from the interaction module 210) indicating that the last time Samantha had significant (depending on the type of contact Samantha elected) contact with Bob and indicating the form of contact (for example, a phone call) that Samantha had with Bob. The warning may be an alarm that sounds, a pop-up on a screen, or a telephone call to Samantha. This alarm (warning) has standard alarm style functionality, including the ability to "snooze" the alarm and the ability to disable the alarm completely. For example, if a contact goes on vacation for a week (e.g., when Bob is on vacation for a week), it is unrealistic for a user to interact with that person. In such a case, the snooze may be used to discount that week of non-interaction. In other words, the lack of interaction is not considered negatively and is not negatively reflected in the interaction module 210.

In accordance with exemplary embodiments, the interaction module 210 displays an ongoing interaction meter for Samantha to observe. In the non-limiting example, Samantha wants to be able to keep track of interaction frequency at a glance. When Samantha looks at her buddy list (e.g., contact list), Samantha sees the interaction level on the interaction meter which allows Samantha an opportunity take action before she receives a warning from the interaction module 210.

As discussed in exemplary embodiments, Samantha can set interaction levels (categories) utilizing the interaction module 210. For example, Samantha can determine what level of interaction constitutes "frequent" interaction. Samantha may feel that contacting Bob once a week is sufficient, or Samantha may want to contact him once a day. Samantha can set up the parameters for the different categories of interaction, and Samantha can create new categories of interaction. There is no limit to the various categories and the parameters for each category, and the parameters for the categories may be set as desired.

Further in accordance with exemplary embodiments, Samantha may set interaction levels by grouping. As a non-limiting example, if Samantha is using interfaces (of the interaction module 210) that include groups, she can apply interaction warning levels at the group level as well. For example, Samantha may have a group set for frequent interaction by either IM or email.

Figure 4:
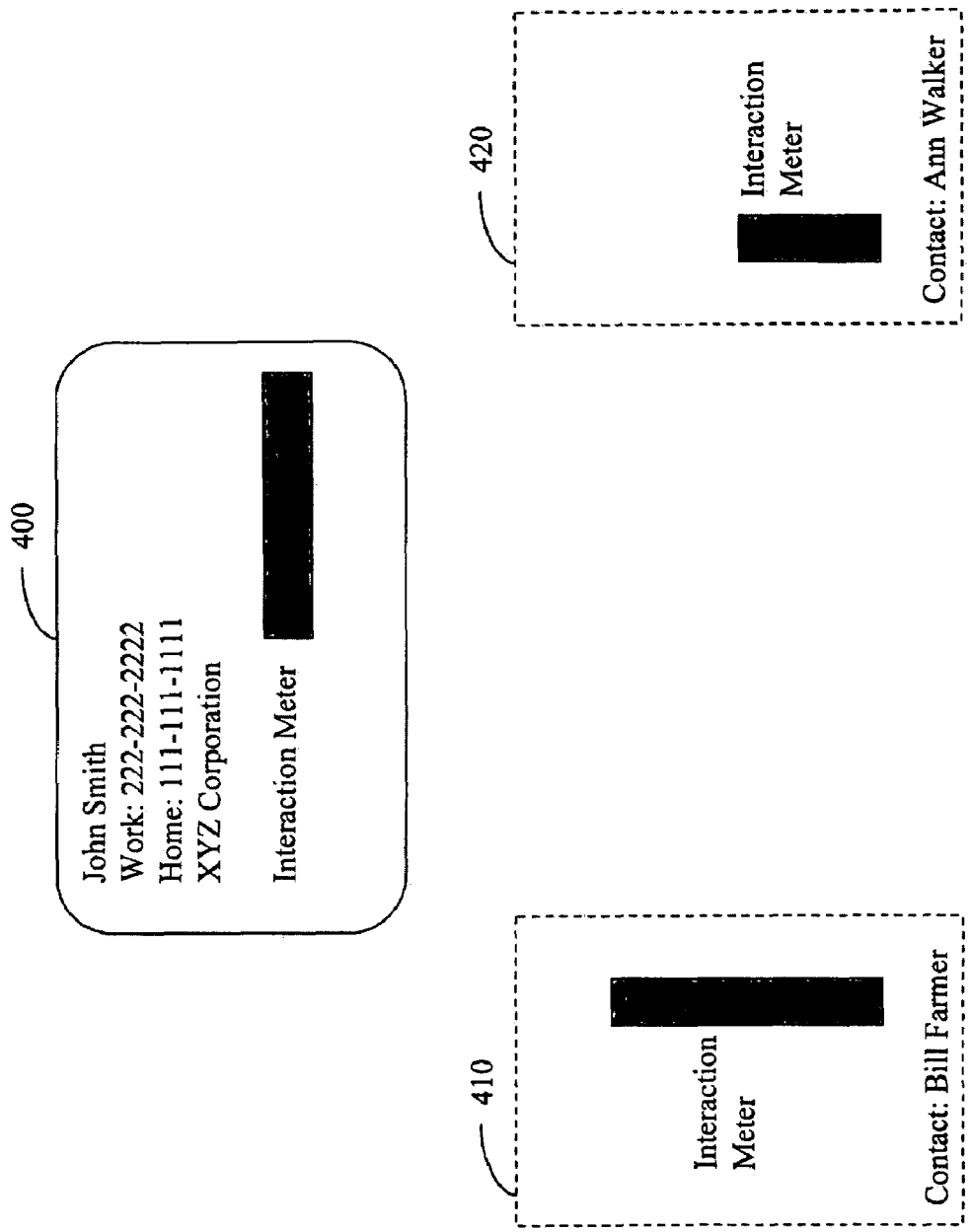
FIG. 4 illustrates non-limiting examples of indicators in accordance with exemplary embodiments.

Additionally, according to exemplary embodiments, the interaction module 210 can be incorporated with a buddy list for, e.g., instant messaging. The interaction module 210 provides a visualization that is readily understandable and accessible from the buddy list and chat windows for IM. The visualization may be implemented using a GUI of the interaction module 210. The visualization for the user may include an indicator (such as the ongoing indication meter) that is readily decipherable "at-a-glance". As a non-limiting example, the indication meter may be a bar graph or an icon that indicates the interaction level for respective contacts. Also, the visualization may be expanded to include the date and method of the last interaction. For example, a green phone with today's date next to the phone may indicate that the user just talked to that contact today, a red email icon may indicate that the user sent an email to that contact a week ago but has not been in contact with the contact since then. As a non-limiting example, FIG. 4 provides illustrations of indicators having interaction meters in indicators 400, 410, and 420.

As discussed herein, a buddy list interaction would allow for easy setting of the desired interaction level, and this could be applied at the individual or group level. In addition, exemplary embodiments allow the user to set the desired means of communication (e.g., email) to interact with the contact. When a warning is triggered, the desired means of communication would be made readily available from the warning to communicate with the contact. For example, a "send email" button may appear that can automatically send the email to the contact based on the information stored in the buddy list or that can be initiated by the user to send an email to the contact.

Note that exemplary embodiments can be extended beyond the buddy list to other contact type applications, such as contacts lists, address books, and/or customer relationship management (CRM) tools (such as Salesforce). Accordingly, exemplary embodiments allow the visualization previously mentioned to be surfaced in a business card hover 400 (shown in FIG. 4), for example, or with a specific view control (such as view by "last interaction"). Exemplary embodiments may also include the option to launch a full dashboard view from the buddy list application, chat application, or contact application. As a non-limiting example, the business card hover 400 may be implemented in business cards as a part of Notes™ and Sametime™. The Dashboard, on the other hand, could be a much larger screen that not only shows the person's name but details such as the last interaction, the type of interaction, a history of interactions, and when the user should next interact with the contact in order to raise the interaction indicator. This information may also be included as part of the business card hover 400, the indicators 410 and 420, or any other type of visual display for the user.

Figure 3:
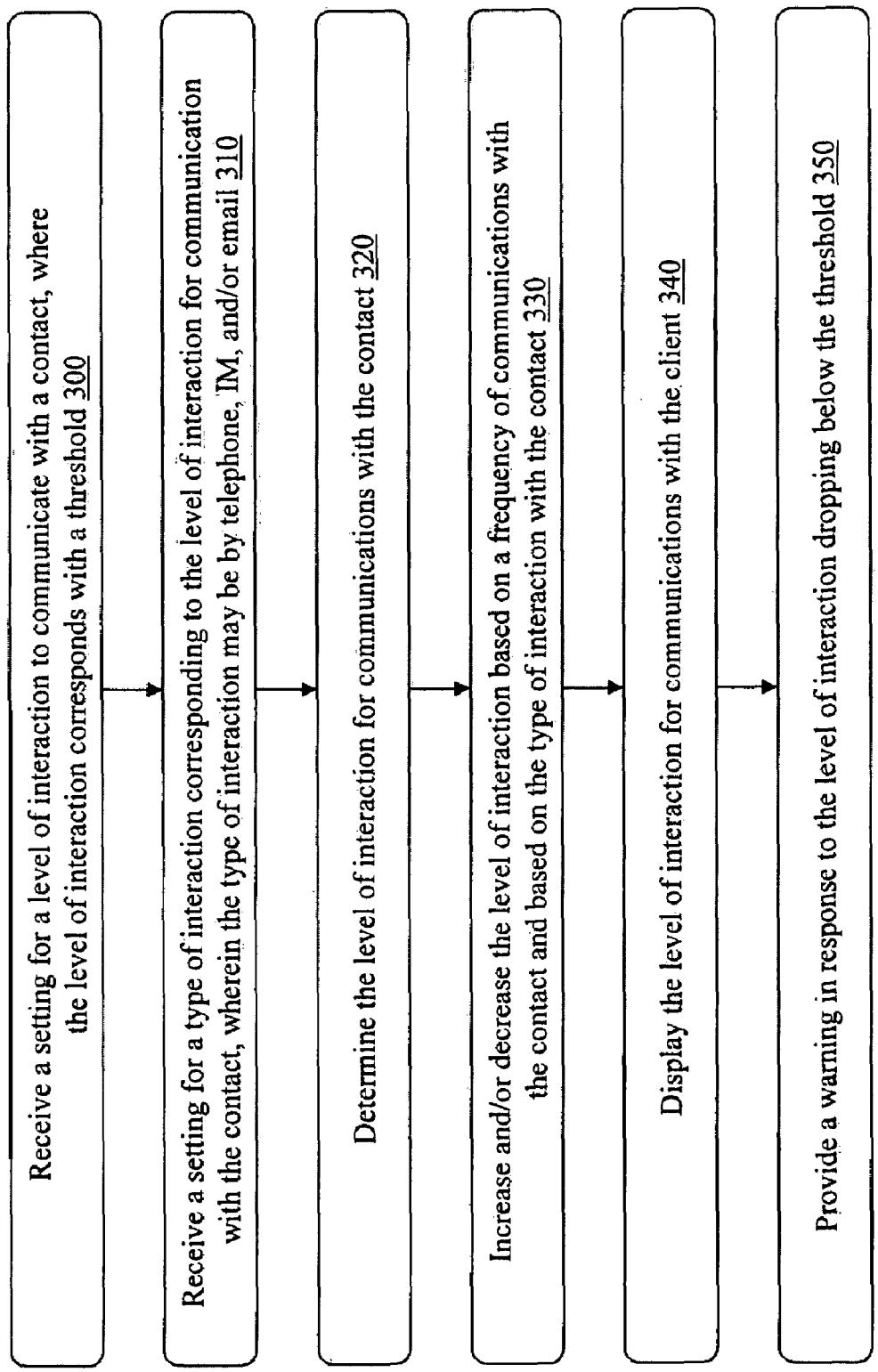
FIG. 3 illustrates a method to prompt a user to communicate with contacts based on a preset threshold of interaction in accordance with exemplary embodiments.

FIG. 3 illustrates a method for an interaction reminder to prompt a user to communicate with contacts in accordance with a preset threshold of interaction in accordance with exemplary embodiments.

A setting is received (e.g., by the interaction module 210) for a level of interaction to communicate with a contact, where the level of interaction corresponds with a threshold at 300. As a non-limiting example, the level of interaction being set may be weekly, biweekly, monthly, bimonthly, quarterly, yearly and so forth. In fact, any desired level of interaction may be set for communications with the contact.

A setting is received (e.g., by the interaction module 210) for a type of interaction corresponding to the level of interaction for communications with the contact, where the type of interaction comprises at least one of a telephone communication, an instant messaging communication, and/or an electronic message communication at 310.

The level of interaction is determined (by the interaction module 210) for the communications with the contact at 320.

The level of interaction is increased and/or decreased (by the interaction module 210) based on a frequency (or lack of frequency) of communications with the contact and based on the type of interaction with the contact at 330. Different weights may be applied to the type of communication with the contact, and the different weight may be factored into increasing and decreasing the level of interaction to indicate the amount of interaction. Also, the parameters may be set so that each type of communication is weighted the same. Further, the user may primarily communicate by instant messaging with the contact, and each instant message may weigh the same in determining the level of interaction.

The level of interaction is displayed for communications with the client (by the interaction module 210) at 340. A warning is provided in response to the level of interaction dropping below the threshold (by the interaction module 210) at 350.

The level of interaction may be displayed as a bar graph to indicate an amount of communication with the contact. The contact can be multiple contacts or groups, and the level of interaction may display multiple bar graphs to respectively indicate an amount of communication with each one of the contacts. Also, certain weights may be applied to the type of interaction when increasing and decreasing the level of interaction.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for an interaction reminder to prompt a user to communicate with contacts in accordance with a preset threshold of interaction, comprising:
   receiving a setting for a level of interaction to communicate with a contact, wherein the level of interaction corresponds with a threshold;
   receiving a setting for a type of interaction corresponding to the level of interaction for communication with the contact, wherein the type of interaction comprises at least one of a telephone communication, an instant messaging communication, and an electronic message communication;
   determining the level of interaction for communications with the contact;
   increasing and decreasing the level of interaction based on a frequency of communications with the contact and based on the type of interaction with the contact;
   displaying the level of interaction for communications with the contact; and
   providing a warning in response to the level of interaction dropping below the threshold, wherein the level of interaction is displayed as a plurality of bar graphs to respectively indicate an amount of communication with each one of the plurality of contacts.

2. The method of claim 1, wherein the level of interaction is displayed as a bar graph to indicate an amount of communication with the contact.

3. The method of claim 1, wherein weights are applied to the type of interaction when increasing and decreasing the level of interaction.

* * * * *